3,252,752
METHOD FOR PRODUCING PURE SILANE AND CHLORINATED SILANES
Franz Arthur Pohl and Toni Hauskrecht, Belecke (Mohne), Germany, assignors to Licentia Patent-Verwaltungs-G.m.b.H., Hamburg, Germany
Filed Jan. 9, 1959, Ser. No. 785,847
Claims priority, application Germany, Jan. 11, 1958, L 29,438
4 Claims. (Cl. 23—14)

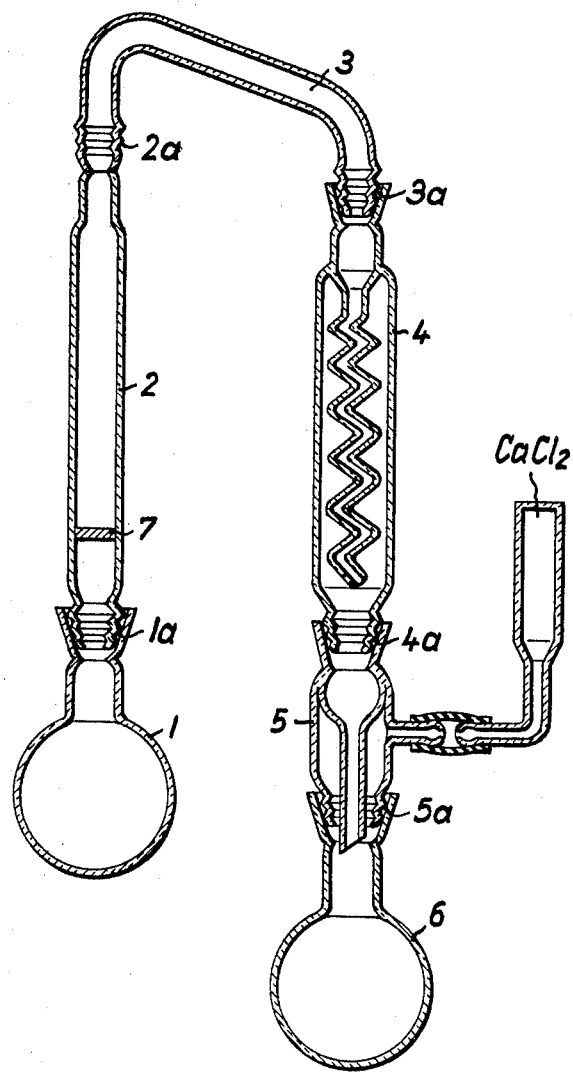

This invention relates to a method for producing pure silane and partly or completely chlorinated silanes.

When silicon is to be used in electrically semiconductive arrangements such as rectifying devices, photoelectric elements, transistors and similar electrically, magnetically or light-controlled unsymmetrically conducting semiconductor systems, this chemical element must be produced well crystallized and preferably as monocrystals and with an extraordinary degree of purity.

To this end, it is known to thermally decompose silane or silicon halides, eventually in the presence of hydrogen, and to obtain the elementary silicon in compact or in powder form. The conversion of silicon halides or silane to elementary silicon can be effected as described, for instance, by F. B. Litton and H. C. Andersion in "J. Electrochem. Soc.," 101 (1954), pages 287–292 and by J. M. Wilson in "Research," 10 (1957), page 166.

After the silicon obtained in the manner described in these publications has been transformed into a polycrystalline or monocrystalline state, it still contains relatively considerable amounts of impurities which make it unsuited for use as a semiconductor. Therefore, the silicon material is brought into rod shape and then subjected to repeated recrystallization according to the so-called zone-melting by creating a liquified zone in the silicon rod and causing the same to wander through the rod body repeatedly. This process is described, for instance, by W. G. Pfann in "J. of Metals" (July 1952), pages 747–753.

However, all these measures are not sufficient to produce a crystalline silicon that fully satisfies the extreme degree of purity that is desired in the art of semiconductors.

In particular, it is not possible to remove boron from the silicon except to a very unsatisfactory degree. Since boron as an element of the third group of the Periodic Table of Mendeleyev is electrically active in silicon, it is not possible to determine the electrical properties of the silicon containing boron impurity centers in uncontrollable amounts and random distribution uniformly and with sufficient accuracy.

Moreover, very small amounts of boron in the order of $10^{-7}$ down to $10^{-8}$ percent per gram-atom of silicon cause noticeable electrical disturbances.

For this reason, a purification of silane or partly or completely chlorinated silanes for the removal of boron by fractionated distillation based on the differences between the boiling point of silane or the aforesaid silane derivatives and borane or chlorinated boranes is not sufficiently effective, the afore-said differences ranging only from 20 to 70° centigrade; consequently even when a large portion of the boron impurities has been eliminated in this manner, there are still boron impurities retained in greater amounts than are permissible in the use of the silicon as semiconductor material.

It is, therefore, an object of our invention to provide a process for producing silane and partly and completely chlorinated silanes, i.e., mono-, di-, trichlorosilane and silicon tetrachloride, and which are exceptionally free from borane and chlorinated boranes a starting material for the production of boron-free elementary, crystalline silicon for use in the semiconductor field.

This object is obtained by the process according to our invention which comprises the steps of (a) Charging a suitable conventional adsorbent with an inorganic or organic solid or liquid substance consisting of molecules each of which contains at least one nitrogen, phosphorus, oxygen, sulfur chlorine or fluorine atom having at least one lone electron pair, whereby said substance is capable of acting as a purifying agent for silane or chlorinated silanes by forming relatively high-boiling addition compounds with the boron impurities contained in the silicon compound in particular with borane, and partly and completely chlorinated boranes; and (b) Passing a stream of gaseous silane or one of the above-mentioned partially or completely chlorinated silanes containing borane or chlorinated borane as impurities over the aforesaid adsorbent, whereby the borane and chlorinated boranes are retained by the adsorbent, and a high-purity silane, partially chlorinated silane, or silicon tetrachloride is obtained.

"Lone electron pairs" are discussed, for instance, in Karrer, "Organic Chemistry," fourth English edition (1950), pages 65 and 66.

We have discovered by extensive experiments that certain inorganic and organic substances which contain in their molecules a nitrogen, phosphorus, oxygen, sulfur, chlorine or fluorine atom having a lone pair of electrons, when charged on a suitable conventional adsorbent material such as pumice, active carbon, silica gel, or the like will adsorb from a borane-contaminated or chlorinated borane-contaminated stream of gaseous silane or partly or completely chlorinated silane only the gasified borane and the chlorinated boranes, but not the gaseous $SiH_4$ or the partily or completely chlorinated derivatives of the latter, i.e., $SiH_3Cl$, $SiH_2Cl_2$, $SiHCl_3$ or $SiCl_4$.

For these above-listed inorganic or organic absorbing agents will form thermically and chemically stable addition compounds with the borane and chlorinated boranes, but not with $SiH_4$ and its chlorinated derivatives. These addition compounds of the absorbing agents with borane and chlorinated boranes are solid or liquid at the boiling points of the above-listed compounds of silicon and have such as low vapor pressure at these temperature ranges, that they are non volatile.

The silane, partly chlorinated silanes or silicon tetrachloride purified according to the above described process contain no boron impurity that can be detected either with the well known methods of trace analysis or with the new greatly refined method for boron determination described hereinafter. The content of boron in the aforesaid purified silicon compounds is, therefore, at least below $10^{-7}$ and preferably below $10^{-9}$ percent by weight.

Thus far, no chemical analyses for traces are known to have a sufficient degree of sensitivity to determine $10^{-8}$ to $10^{-10}$ parts by weight of boron per part of silicon, since the reagents required in the known analytical methods such as sodium hydroxide contain boron impurities in higher concentrations than those mentioned above.

Electrical conductivity measurements employed for determining the amounts of boron present in silicon are equally unsatisfactory, since these methods can only determine total amounts of impurity centers present in silicon, and an actual amount of boron present may be disguised by the presence of other impurities of opposite conductivity.

The determination of the boron content in the silane and chlorinated silane purified according to the method of our present invention, has been carried out with a new method described in "Actas do XV Congresso Internacional de Quimica Pura e Aplicada (Quimica Analitica) I. 30, Lisboa, 1956." The new method does not employ inorganic salts as reagents and thus avoids the contamination of the analytical reaction products with boron introduced with these salts. According to the new method of boron determination in silicon, silicon crystals which have not been comminuted, are treated in an analytical apparatus made of quartz, with hot bromine vapors. The silicon bromide contained therein is hydrolized and then separated by percolation with methanol and isopropyl ether. The extracted boric acid is determined photometrically with curcumin. In this manner, $10^{-9}$ parts by weight of boron per part of silicon can be determined with an exactness of $\pm 10\%$.

A suitable stable addition compound with borane or a chlorinated borane is formed, in the process according to the invention, with the supported above-mentioned purifying agents which are compounds characterized by the fact that their molecules contain as "additive" atom N, P, O, S, F or Cl atoms which possess at least one "lone" electron pair forming part of the external electron shell of eight electrons surrounding the aforesaid "additive" atom in the classes of inorganic and organic compounds described further below.

While the other electron pair or pairs constituting the octet of the aforesaid external shell each pertain to the "additive" atom in common with one of the other atoms constituting the molecule in question and are, therefore, "shared" electron pairs, the remaining electron pair or pairs are the above-named "lone" or unshared pair or pairs and pertain exclusively to the "additive" atom itself. The theory of shared and lone, or unshared, electron pairs is further discussed in W. Hueckel, "Anorganische Strukturchemie" (1948), pages 66 to 90, published by F. Enke, Stuttgart, Germany, and by Fieser & Fieser, "Organic Chemistry," 1950, pages 8, 9, 18, and 19.

The single unshared electron pair of the "additive," i.e., the N, P, O, S, F or Cl atom present in the molecules of the groups comprising the above-listed compounds is capable of forming an addition compound with the boron atom in a borane or chlorinated borane, for instance a boron trichloride molecule, whereby this electron pair is shared by the boron atom and the nitrogen or other "additive" atom in an unpolar or covalent bond. Thereby, the number of electrons in the outer electron shell of the boron atom is increased from six in, for instance, the trichloride molecule, to eight in the addition compound.

As a result of this change in the electron shell of the boron atom, the planar character of, for instance, the BCl₃ molecule is changed to a tetrahedronal configuration in the addition molecule, in which the boron atom occupies the center, while the three chlorine atoms and the nitrogen or other "additive" atom of one of the purifying agents listed below occupy the four corners of the tetrahedron. The nitrogen or other "additive" atom contributing its lone electron pair to this addition molecule is also termed the "donor" while the boron atom would be termed the "acceptor" and the bond between the purifying agent molecule on the one hand, and borane or a chlorinated borane, for instance the boron trichloride molecule on the other hand, may also be termed an "acceptor-donor bond."

As the purifying agents suited according to the invention for converting borane or a chlorinated borane including boron trichloride to a corresponding addition compound, there can be used the following substances:

I. Organic or inorganic solid or liquid substances containing per molecule a nitrogen atom having at least one lone electron pair, among which substances there are cyanogen bromide, CNBr; nitriles, in particular propionitrile $C_2H_5CN$; amides, in particular cyanamide, $CN.NH_2$; nitrohydrocarbons, in particular ortho-, para-, or meta-dinitrobenzene, $C_6H_4(HO_2)_2$; a tertiary aminohydrocarbon, in particular dimethylaniline $C_6H_5N(CH_3)_2$; azo compounds, in particular azobenzene $C_6H_5.N:N.C_6H_5$; lactanes, in particular caprolactane

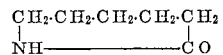

II. Organic or inorganic solid or liquid substances containing per molecule an oxygen atom having at least one lone electron pairs, among which substances there are aldehydes, in particular benzaldehyde $C_6H_5CHO$; ketones, in particular methylethylketone $CH_3.CO.C_2H_5$; oxims in particular dimethylglyoxim

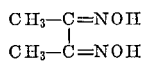

lactons, in particular valerolactone

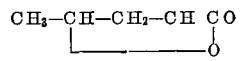

cyclic ethers, in particular dioxane

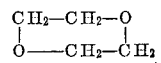

or phosphorus oxychloride $POCl_3$;

III. Organic and inorganic solid and liquid substances, which contain per molecule a phosphorus atom having at least one lone electron pair, such as phosphorus halides, in particular phosphorus trichloride $PCl_3$, and alkylphosphines, in particular diethylphosphine $(C_2H_5)_2PH$;

IV. Organic and inorganic solid or liquid substances which contain per molecule a sulfur atom having two lone electron pairs, such as thiophenol, $C_6H_5SH$, and its derivatives, in particular its liquid homologues, and furthermore heterocyclic hydrocarbons containing a sulfur atom such as trimethylthiophenols, in particular 2,3,5-trimethylthiophenol,

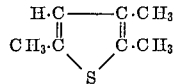

V. Organic and inorganic solid or liquid substances which contain per molecule a chlorine atom having at least one lone electron pair, such as chlorinated arylhydrocarbons, in particular triphenylchloromethane $(C_6H_5)_3CCl$; and metal chlorides such as aluminum chloride $AlCl_3$ or ferric chloride $FeCl_3$; and VI. Organic and inorganic solid or liquid substances which contain per molecule a fluorine atom having at least one lone electron pair, such as triphenylfluoromethane $(C_6H_5)_3CF$.

We have further discovered that the purifying effect of the purifying agent, i.e., the donor molecule is the greater, the better the steric configuration of the donor molecule fits into the above-described tetrahedronal addition molecule. This factor contributes to a higher thermal as well as chemical stability of the addition compound with borane or chlorinated boranes and correspondingly to a lower vapor pressure and improved separability from the silicon compound to be purified of borane and chlorinated boranes. This is particularly achieved when on the one hand the donor atom is of smaller atomic volume, as in the case of nitrogen as the donor atom, and on the other hand, the molecule containing the donor atom is not too large and therefore permits formation of a well balanced tetrahedronal system.

The formation of the additive bonds of the purifying agent molecule and the borane or chlorinated borane molecule is favored by having the addition reaction take place at a temperature range between $-100°$ C. and $+100°$ C., and preferably between 5 and 10 degrees centigrade above the boiling temperature of the silane or partly chlorinated silane or silicon tetrachloride to be purified.

Suitable adsorbent materials as supports for the above enumerated purifying agents are granulated active carbon, silica gel, or pumice, which materials are preferably impregnated with a solution of the solid or liquid purifying agent in an absolutely dry (water-free), easily volatilizable solvent such as diethylether, acetone, or methylene chloride, whereupon the solvent is evaporated by light heating.

The process according to the invention can preferably be carried out in an apparatus as illustrated schematically in the accompanying drawing.

This apparatus is made preferably of quartz glass and comprises a distilling round flask 1 with an absorption tube 2 set on top of the flask 1 and connected thereto, for instance, by a ground-in stopper connection 1a.

A bridging pipe 3 is connected to tube 2 by a ground-in stopper connection 2a and to the upper end of condenser 4, for instance a Dimroth condenser as shown, by means of ground-in stopper connection 3a.

A linking branch piece 5 is connected via ground-in stopper 4a to the lower end of condenser 4 and sits with its ground-in lower end in collector flask 6. To the branch exit 5a of piece 5, there is fastened a calcium chloride tube.

Preferably in its lower third, the adsorption tube 2 is provided with a melted-in quartz glass frit 7.

The control of the required adsorption temperature is effected from outside tube 2, for instance by means of a heating furnace or a refrigerating mantle containing a suitable coolant such as a mixture of acetone and solid carbon dioxide.

The Dimroth condenser illustrated in the drawing is particularly suited for the higher boiling silicochloroform and silicon tetrachloride, while an intensive supertive tube condenser is preferred when purifying silane and the less chlorinated silanes which are gaseous at room temperature, i.e., mono- and dichlorosilane. In this case the collector flask 6 is also cooled with a coolant mixture as described.

According to a further mode of operation of the method according to the invention, the silicon halide obtained by the above-described steps can be further processed to obtain a boron-free elementary silicon of the highest purity. To this end, the resultant silicon halide is decomposed in a closed reaction vessel under sufficiently strong heating, for instance, by indirect high frequency induction heating under reduced pressure such as in a vacuum and eventually in the presence of a reduction agent such as hydrogen. The elementary silicon being set free in this manner, is preferably deposited on a movable receptor body, the speed of movement of which is so controlled, that the silicon is deposited in the liquid state and forms a solid, for instance, rod-shaped body as it is moved out of the heated zone in the apparatus.

Contact of the liquid silicon deposit with extraneous matter such as the walls of the reactor and the like, can be avoided by using as the receptor body a solid, crystalline silicon ingot.

EXAMPLE I 100 grams (g.) of granulated pumice (grain size about 2 to 3 millimeters) are impregnated with a solution of 2 g. of succinic dinitrile, $CN—CH_2—CH_2—CN$, in 50 milliliters (ml.) of acetone, dried at about 60° C. and filled into the adsorption tube 2 of the apparatus described hereinbefore. After heating the adsorption tube to about 35 to 40° C., silicochloroform is slowly distilled from the flask 1 and collected, purification, in flask 6.

The above mentioned charge permits to purify about 5000 grams of silicochloroform.

EXAMPLE II

Example I is repeated, but the charge in the adsorption tube 2 is replaced by 110 g. active carbon having a grain size of 2 to 3 mm., and being impregnated with a solution of 4 g. of para-dinitrobenzene, $$p—NO_2—C_6H_4—NO_2$$

in 50 ml. of methylenechloride and dried at about 40° C.

EXAMPLE III

Example I is repeated but the charge in the adsorption tube 2 is replaced by 150 g. of granulated silica gel having a grain size of about 2 to 3 mm., and being impregnated with a solution of 6 g. of triphenylchloromethane, $(C_6H_5)_3 CCl$, and dried at about 40° C.

EXAMPLE IV 110 g. of a charge prepared as described in Example II are filled into adsorption tube 2 and the temperature of the latter raised by external heating to about 55 to 60° C., whereupon silicon tetrachloride, $SiCl_4$, is slowly distilled from flask 1 and, after purification, collected in flask 6.

This charge is sufficient to purify about 5000 g. of $SiCl_4$, from borane and chlorinated boranes, in particular $BCl_3$ accompanying the $SiCl_4$.

EXAMPLE V

Example IV is repeated, but with a charge as described in Example III. About 5000 g. of $SiCl_4$ can be purified with this charge.

EXAMPLE VI 100 g. of granulated pumice having a grain size of about 2 to 3 mm. are impregnated with a solution of 4 g. of azobenzene, $C_6H_5·N:N·C_6H_5$, in 50 ml. of diethylether and dried at about 40° C. This charge is then filled into adsorption tube 2, and dichloro-silane, $SiH_2Cl_2$ is then slowly distilled from flask 1 and collected in flask 6, which is cooled to —30° C.

The charge serves for purifying about 5000 g. of $SiH_2Cl_2$.

EXAMPLE VII

Example VI is repeated, but the charge is replaced by 110 g. of granulated active carbon having grain sizes of about 2 to 3 mm., impregnated with a solution of 3 g. of diethylphosphine, $(C_2H_5)_2PH$, in 50 ml. of carbon sulfide, $CS_2$, and dried at about 50° C.

The charge serves for purifying about 5000 g. of $SiH_2Cl_2$.

EXAMPLE VIII

Example VI is repeated, but the charge is replaced by 150 g. of granulated silica gel having grain sizes of about 2 to 3 mm., and impregnated with a solution of 6 g. of triphenylfluoromethane, $(C_6H_5)_3CF$, in 50 ml. of methylene chloride, and dried at about 40° C.

About 5000 g. of $SiH_2Cl_2$ can be purified with the above charge.

EXAMPLE IX

A charge is prepared from 150 g. of granulated silica gel having a grain size of 2 to 3 mm. by impregnating the latter with a solution of 2 g. of propionitrile, $C_2H_5CN$ in 50 ml. of diethylether and drying at about 35° C. The charge is filled into adsorption tube 2 and the temperature of the latter cooled to —20° C. by surrounding the tube with a coolant jacket filled with a corresponding coolant mixture. Monochlorosilane, $SiH_3Cl$, is then distilled from flask 1, at a temperature of about —30° C., and, after purification from borane and chlorinated boranes, in particular from $BH_2Cl$, in adsorption tube 2, it is collected in flask 6 which is cooled to about —70° C.

The charge is sufficient to purify about 5000 g. of $SiH_3Cl$.

EXAMPLE X

Example IX is repeated but the charge of tube 2 is replaced by 110 g. of granulated active carbon having a grain size of 2 to 3 mm., impregnated with a solution of 3 g. of benzaldehyde, $C_6H_5CHO$, in 50 ml. of diethylether, and dried at about 40° C.

About 5000 g. of $SiH_3Cl$ can be purified with this charge.

EXAMPLE XI

Example IX is repeated, but the charge of purifying agent and adsorbent support is replaced by 110 g. of active carbon of grain sizes of 2 to 3 mm., impregnated with a solution of 6 g. of phosphorous trichloride, $PCl_3$, in 50 ml. of diethylether, and drying at about 35° C.

About 5000 g. of $SiH_3Cl$ can be purified with this charge.

EXAMPLE XII 110 g. of active carbon having a grain size of about 2 to 3 mm. are impregnated with a solution of 2 g. of acetonitrile, $CH_3CN$, in 50 ml. of diethylether and dried at about 50° C. This charge is filled into adsorption tube 2 and the latter cooled with a mixture of solid $CO_2$ and acetone, or liquid air to about −100° C. Borane-contaminated silane $SiH_4$ is then distilled from flask 1 through tube 2 into flask 6 which is cooled with liquid air to −150° C. The charge is sufficient to purify about 3000 g. of $SiH_4$.

EXAMPLE XIII

Example XII is repeated, but the charge is replaced by 100 g. of granulated pumice having a grain size of about 2 to 3 mm., impregnated with a solution of 3 g. of dioxane in 50 ml. of diethylether, and dried at about 35° C. About 3000 g. of $SiH_4$ can be purified satisfactorily with this charge.

EXAMPLE XIV

Example XII is repeated, but the charge is replaced by 150 g. of granulated silica gel having a grain size of about 2 to 3 mm., impregnated with a solution of 3 g. of diethylphosphine, $(C_2H_5)_2PH$, in 50 ml. of diethylether and dried at about 35° C. About 3000 g. of $SiH_4$ can be purified with this charge.

EXAMPLE XV

Example XII is repeated, but the charge is replaced by 150 g. of a charge prepared as described in Example VIII. About 3000 g. of $SiH_4$ can be purified with this charge.

EXAMPLE XVI

Example IX is repeated but the charge of purifying agent and adsorbent support is replaced by 110 g. of granulated active carbon having grain sizes of about 2 to 3 mm., impregnated with a solution of 4 g. of thiophenol, $C_6H_5SH$, in 50 ml. of methylene chloride and dried at about 40° C.

About 5000 g. of $SiH_3Cl$ can be purified with this charge.

EXAMPLE XVII

Example IX is repeated with a charge as described in Example XVI, in which, however, thiophenol is replaced by the same amount of 2,3,5-trimethylthiophene, $(CH_3)_3C_4H:S$, all other conditions remaining equal.

About 5000 g. of $SiH_3Cl$ can be purified with this charge.

EXAMPLES XVIII–XLI

Further charges can be prepared containing the purifying agents as tabulated hereinafter, by proceeding as described in detail in the example listed in the right column of the table:

*Preparation of charge*

| Example No. | Purifying Agent | Solvent | Example to be followed |
|---|---|---|---|
| XVIII | Cyanogen iodine, CNI | $(C_2H_5)_2O$ | I |
| XIX | Benzonitrile, $C_6H_5 \cdot CN$ | $CH_3COCH_3$ | II |
| XX | Acetamide, $CH_3 \cdot CO \cdot NH_2$ | $CH_2Cl_2$ | III |
| XXI | Benzamide, $C_6H_5 \cdot CO \cdot NH_2$ | $(C_2H_5)_2O$ | IV |
| XXII | Meta-nitrotoluene, $NO_2 \cdot C_6H_4 \cdot CH_3$ | $(C_2H_5)_2O$ | III |
| XXIII | 3,5-dinitrotoluene, $(NO_2)_2C_6H_3CH_3$ | $CH_2Cl_2$ | II |
| XXIV | Diethylaminobenzene, $C_6H_5N(C_2H_5)_2$ | $(C_2H_5)_2O$ | III |
| XXV | Diphenylbenzylamine, $(C_6H_5)_2N \cdot CH_2 \cdot C_6H_5$ | $(C_2H_5)_2O$ | I |
| XXVI | p-p'-Azodiphenyl, $C_6H_5 \cdot C_6H_4 \cdot N:N \cdot C_6H_4 \cdot C_6H_5$ | $(C_2H_5)_2O$ | IV |
| XXVII | 1-1'-Azonaphthalene, $C_{10}H_7 \cdot N:N \cdot C_{10}H_7$ | $(C_2H_5)_2O$ | II |
| XXVIII | Valeraldehyde, $CH_3 \cdot (CH_2)_3 \cdot CHO$ | $(C_2H_5)_2O$ | VI |
| XXIX | Caprylaldehyde, $CH_3 \cdot (CH_2)_6 \cdot CHO$ | $(C_2H_5)_2O$ | III |
| XXX | Di-n-butylketone, $C_3H_7 \cdot CO \cdot C_3H_7$ | $CH_2Cl_2$ | V |
| XXXI | Benzil, $C_6H_5 \cdot CO \cdot CO \cdot C_6H_5$ | $(C_2H_5)_2O$ | IV |
| XXXII | Acetaldoxime, $CH_3 \cdot CH:NOH$ | $(C_2H_5)_2O$ | VII |
| XXXIII | Benzaldoxime, $C_6H_5 \cdot CH:NOH$ | $(C_2H_5)_2O$ | VIII |
| XXXIV | Butyrolactone, $CH_2CH_2CH_2CO$ \\ $\quad\quad\quad\quad \text{L—O—J}$ | $CH_3COCH_3$ | II |
| XXXV | 2,5-dimethylfuran, $C_4H_2O(CH_3)_2$ | $CH_2Cl_2$ | I |
| XXXVI | 2,5-diphenylfuran, $C_4H_2O \cdot (C_6H_5)_2$ | $(C_2H_5)_2O$ | IV |
| XXXVII | Phosphorus tribromide, $PBr_3$ | $(C_2H_5)_2O$ | IV |
| XXXVIII | Phosphorus oxybromide, $POBr_3$ | $(C_2H_5)_2O$ | VII |
| XXXIX | Triethylphosphine, $(C_2H_5)_3P$ | $(C_2H_5)_2O$ | VI |
| XL | Ethyldiphenylphosphine, $(C_6H_5)_2P \cdot C_2H_5$ | $(C_2H_5)_2O$ | IV |
| XLI | Iron trichloride, $FeCl_3$ | $(C_2H_5)_2O$ | V |

Instead of using a liquid solvent to distribute the purifying agent over the surface of the adsorbent material, it is also possible, according to another mode of operating the process according to the invention, to use an inert gaseous vehicle such as nitrogen, argon and the like for entraining the purifying agent and thus applying it to the adsorbent. The following examples will illustrate this mode of operation.

EXAMPLE XLII 1,4-dioxane, 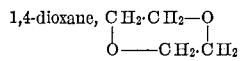

is slowly evaporated in suitable conventional evaporating vessel by heating the liquid to a temperature closely below the boiling point, i.e., for instance to 99 to 100° C., and a current of pure gaseous nitrogen is conducted through the evaporating vessel at a flow rate of 5 to 10 liters per hour and continuously entrains the dioxane vapors formed. The gaseous vehicle charged with dioxane vapors is then conducted through a layer of about 150 g. granulated active carbon, silica gel or pumice having a grain size of from 2 to 3 millimeters, filled into the adsorption tube 2 of the apparatus illustrated in the drawing, until about 3 to 4 g. of the purifying agent have been adsorbed, while the charge in the tube 2 is heated at about, for instance, 95° C. to ensure a uniform distribution of the dioxane precipitation over the entire charge.

The silicon compound to be purified, is then passed through the adsorption tube 2 as described in the preceding examples.

EXAMPLES XLIII–XLV

Example XLII is repeated with a number of other purifying agents listed in the table below and the evaporation temperature and heating temperature of the adsorption tube were accordingly chosen as indicated. All other conditions of Example XLII remained the same.

| Example No. | Purifying Agent | Evap. Temp. (° C.) | Temperature of Adsorption Tube 2 (° C.) |
|---|---|---|---|
| XLIII | Acetonitrile | 75–80 | 70–75 |
| XLIV | Cyanogenbromide | 55–60 | 50–55 |
| XLV | Valeraldehyde | 95–100 | 90–95 |

This mode of applying the purifying agent to the adsorbent with the aid of a gaseous vehicle is used most easily with purifying agents having boiling points below 110° C. Purifying agents having higher boiling points must either be evaporated under vacuum or cause other problems of handling, in particular of satisfactorily thermically insulating the apparatus in a manner that will assure the necessary higher temperatures.

EXAMPLE XLVI

This example illustrates the further processing of silane or chlorinated silane, for instance silicochloroform $SiHCl_3$, purified from boron impurities by the method of the invention illustrated in the preceding examples. The purified silicochloroform is evaporated and is then admixed to a stream of pure hydrogen and the mixture introduced into a quartz vessel. The rate of flow of the hydrogen may be about 100 liters per hour. The ratio of admixture of silicochloroform to hydrogen is preferably so adjusted that about 30 to 60, and on an average 40 ml. of silicochloroform are evaporated per 100 liters of hydrogen. By a corresponding adjustment of the rate of flow of the gases at the inlet and outlet of the reaction chamber in the quartz vessel, it is possible to maintain either a slight excess pressure or a slightly reduced pressure in that chamber. The excess of non-reacted hydrogen, the non-reacted portion of silicochloroform, and the gaseous reaction products between the two gas components resulting from the reduction and decomposition of the silicochloroform leave the chamber through the aforesaid outlet.

A rod-shaped silicon body having a diameter between 10 and 25 mm., for instance 15 mm., is arranged in the quartz vessel displaceably in the direction of the rod axis. At one end of the rod, which is preferably positioned vertically in the quartz vessel, heating by means of a high frequency emitter of about 2 to 5 kilowatts, for instance 2 kilowatts, is effected to melt the tip of the rod by inductive heating. This can be achieved with a frequency higher than 100 kilocycles, for instance of about 1 megacycle. The rod tip should consist of highly purified silicon. In the gas-filled space surrounding the liquefied silicon rod tip, a thermic decomposition and reduction of silicochloroform with the entraining hydrogen takes place. The elementary silicon thus formed from the silicochloroform is incorporated in the liquid silicon tip.

Now, the silicon rod is removed out of the reaction space in axial direction at a velocity of about 0.1 to about 2 centimeters (cm.) per hour, for instance in the present example at a velocity of 0.5 cm. per hour. The velocity of withdrawal is adjusted to the rate of silicon deposition on the liquid tip of the silicon rod, so that the volume of the liquid zone at the end of the rod remains substantially constant. Sealing means are provided where the cooled down silicon rod is withdrawn from the reaction chamber to the outside of the quartz vessel so that the movement through the reaction chamber and out of the latter can be effected by one and the same pull at the cooled outer rod end. Pieces can be cut off from the continuously growing silicon rod. In this manner it is possible to grow the silicon rod via its liquid tip, by about 2 grams (g.) of highly pure silicon per hour.

Other examples of carrying out this method of depositing silicon from the vapor phase are described, for instance, in the French Patent 1,125,277 to Siemens & Halske A.G.

Purification may preferably be continued to remove impurities other than boron by repeated fusion and recrystallization by zone-refining as described by P. H. Keck in "Physica," 20 (1954), No. 11, pages 1059 to 1065. It becomes thus possible to obtain a silicon of substantially improved degree of purity from the silane or chlorinated silane produced by the process according to the invention.

EXAMPLE XLVII

The highly pure silicon obtained according to the preceding example can then be further purified by zone-refining in the following manner. This zone-refining treatment is carried out in an evacuated quartz tube which is surrounded at one zone by a high frequency heating device. A rod-shaped silicon body is disposed coaxially with the axis of the quartz tube in the interior of the latter and is supported displaceably at its two ends. With the aid of the aforesaid high frequency device, a transverse zone of the silicon rod is molten, however while maintaining the coherence of the rod surface. The silicon rod is now moved in axial direction so that the molten zone moves from one end of the rod toward the other. This process may be repeated several times by moving the rod back and forward in axial direction. By this treatment, a redistribution of impurities other than boron that may eventually still be present in the silicon, takes place at the border zone between the molten zone and the solidifying portion of the rod; i.e., that part of the rod that is leaving the melting zone. Those impurities which have a distribution coefficient smaller than 1 are thereby accumulated in the liquid zone and are moved due to the translation of the molten zone through the rod toward the one end of the silicon rod.

For instance, a rod-shaped silicon body having a diameter of 10 to 30 mm., and in the present instance 15 mm., as obtained by the preceding example, can be subjected to the above-described zone-refining. The high frequency inductive heating device may operate with an output of 2 to 10 kilowatts and at frequencies higher than 100 kilocycles. The width of the molten zone may be 10 to 20, for instance 15 mm., while its diameter is, of course, equal to that of the rod. The zone may be displaced through the rod at a velocity of 1 to 20 cm. per hour, for instance in this example 10 cm. per hour.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What we claim is:

1. A process for producing a purified volatile silicon compound of the general formula $$SiH_xCL_{(4-x)}$$

wherein $x$ is an integer ranging from 0 to 4, contaminated with at least one boron-containing impurity, of the general formula $$BH_yCl_{(3-y)}$$

wherein $y$ is an integer ranging from 0 to 3, comprising the steps of
   (1) charging an adsorbent with a purifying agent being:
      (a) capable of forming an addition compound with said boron-containing impurity, said addition compound being non-volatile at the boiling point of said volatile silicon compound,
      (b) selected from the group consisting of a solid and a liquid, and
      (c) consisting of molecules each of which contains at least one member of the group consisting of nitrogen, phosphorous, oxygen, sulfur, chlorine and fluorine atoms having at least one lone electron pair;

(2) conducting a gaseous stream of said contaminated volatile silicon compound over the aforesaid adsorbent, charged with said purifying agent, so as to form an addition compound between said purifying agent and said boron-containing impurity, said addition compound being non-volatile at the boiling point of said volatile silicon compound, and being adsorbed on said adsorbent material; and (3) recovering the resultant purified gaseous stream of said volatile silicon compound.

2. The process of claim 1, wherein step (2) is conducted while maintaining said adsorbent material at a temperature above the boiling point of said volatile silicon compound.

3. The process of claim 1, wherein step (2) is conducted while maintaining said adsorbent material at a temperature of about 5–10° C. above the boiling point of said volatile silicon compound.

4. The process of claim 1, wherein said adsorbent material is selected from the group consisting of granulated activated carbon, silica gel and pumice.

References Cited by the Examiner

UNITED STATES PATENTS

| | | | |
|---|---|---|---|
| 745,122 | 11/1903 | Tone | 23—223.5 |
| 1,496,229 | 6/1924 | Jones | 252—437 |
| 2,064,113 | 12/1936 | Heuser | 252—432 XR |
| 2,732,282 | 1/1956 | Bailey et al. | 23—14 |
| 2,818,323 | 12/1957 | Haensel | 23—2 |
| 2,821,460 | 1/1958 | Whelan | 23—205 XR |
| 2,857,249 | 10/1958 | Wolff | 23—205 |
| 2,900,225 | 8/1959 | Clasen | 23—14 |
| 2,947,607 | 8/1960 | Pohl et al. | 23—205 |
| 2,970,040 | 1/1961 | Conn | 23—205 |
| 3,016,289 | 1/1962 | Pohl et al. | 23—205 |
| 3,053,631 | 9/1962 | Wilson | 23—205 |

FOREIGN PATENTS 627,904  8/1949  Great Britain.

BENJAMIN HENKIN, *Primary Examiner.*

MAURICE A. BRINDISI, ANTHONY SCIAMANNA,
*Examiners.*